US006951688B2

(12) United States Patent
Kato et al.

(10) Patent No.: US 6,951,688 B2
(45) Date of Patent: Oct. 4, 2005

(54) CHARGING MEMBER, AND IMAGE-FORMING APPARATUS AND PROCESS CARTRIDGE WHICH MAKE USE OF THE SAME

(75) Inventors: Hisao Kato, Kanagawa (JP); Yoshiaki Nishimura, Shizuoka (JP); Jun Murata, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/679,387

(22) Filed: Oct. 7, 2003

(65) Prior Publication Data

US 2004/0136753 A1 Jul. 15, 2004

(30) Foreign Application Priority Data

Oct. 11, 2002 (JP) ....................................... 2002-299045

(51) Int. Cl.$^7$ ......................... B32B 27/38; B32B 27/32; C08K 5/00; G03G 21/16; G03G 15/02

(52) U.S. Cl. ....................... 428/413; 428/521; 523/437; 523/561; 399/111; 399/168; 399/310

(58) Field of Search ................................ 428/413, 521, 428/188, 418, 463, 462, 522; 523/437, 461; 399/111, 113, 310, 313, 168

(56) References Cited

U.S. PATENT DOCUMENTS

| | | | | | |
|---|---|---|---|---|---|
| 4,841,336 | A | * | 6/1989 | Kusumoto et al. | 399/226 |
| 5,034,777 | A | | 7/1991 | Ohzeki et al. | 355/274 |
| 5,393,467 | A | * | 2/1995 | Yabushita et al. | 252/511 |
| 5,666,615 | A | * | 9/1997 | Nguyen | 399/240 |
| 5,757,508 | A | | 5/1998 | Murata | 358/296 |
| 5,761,581 | A | | 6/1998 | Nojima | 399/174 |
| 6,144,830 | A | * | 11/2000 | Kusaba et al. | 399/302 |
| 6,243,552 | B1 | | 6/2001 | Murata | 399/176 |
| 2002/0022142 | A1 | | 2/2002 | Harada | 428/493 |

FOREIGN PATENT DOCUMENTS

| | | | |
|---|---|---|---|
| EP | 1 069 482 | | 1/2001 |
| JP | 11-65269 | | 3/1999 |
| JP | 2002-105305 | | 4/2002 |
| JP | 2002105305 A | * | 4/2002 |
| JP | 2002-121376 | | 4/2002 |
| JP | 2002212413 | * | 7/2002 |

* cited by examiner

*Primary Examiner*—Kevin R. Kruer
(74) *Attorney, Agent, or Firm*—Fitzpatrick, Cella, Harper & Scinto

(57) ABSTRACT

The present invention relates to a charging member for charging a surface of a member to be charged in an image forming apparatus, and one aspect of the present invention provides a charging member having an outermost surface layer containing a conductive elastic material. The conductive elastic material comprises a polymer including a polar polymer, primarily including (i) acrylonitrile butadiene rubber, (ii) an ethylene oxide-propylene oxide-allyl glycidyl ether terpolymer, and (iii) a homopolymer of epichlorohydrin. The weights x, y and z of the components (i), (ii) and (iii), respectively, have a relationship of $0.2<y/(x+y+z)\leqq 0.5$ and $4<y/z\leqq 20$. This charging member can realize uniform charging and is small in resistance variation, even when used for a long time.

6 Claims, 4 Drawing Sheets

CHARGING MEMBER, AND IMAGE-FORMING APPARATUS AND PROCESS CARTRIDGE WHICH MAKE USE OF THE SAME

BACKGROUND OF THE INVENTION

1. Field of the Invention

This invention relates to a charging member used in an image-forming apparatus, such as an electrophotographic apparatus, and more particularly to a charging member used for a photosensitive-member-charging member, a transfer member, or a developing member and so forth which electrostatically charges the surface of a member to be charged in an image-forming apparatus, such as an electrophotographic apparatus. This invention also relates to an image-forming apparatus, such as an electrophotographic apparatus, and a process cartridge.

2. Related Background Art

In an image-forming apparatus, such as an electrophotographic apparatus (e.g., copying machines and laser printers), and an electrostatic recording apparatus, contact charging is known as a means for charging a member, such as an electrophotographic photosensitive member and a dielectric member. The contact charging is conducted by bringing into proximity to, or contact with, the member to be charged a charging member to which a voltage is kept applied. Compared with corona charging, the contact charging is advantageous, because the voltage applied to the charging member can be lowered and ozone generation can be reduced. The charging member for contact charging must have lower conductivity in order to prevent a leak caused by pinholes, scratches or the like of the surfaces of the member to be charged.

For example, a transfer roller is used in an image-forming apparatus such as an electrophotographic apparatus to transfer a toner image held on a first image-bearing member, such as an electrophotographic photosensitive member, an intermediate transfer member, or a transfer drum, to a second image-bearing member, such as a transfer sheet. The transfer roller brings, via a member to be charged, a transfer sheet into pressure contact with the first image-bearing member holding the toner image on its surface, and electric charges with a polarity opposite to that of a toner constituting the toner image are provided to the transfer roller to electrostatically charge the transfer sheet, whereby the toner is attracted to the paper and the toner image is transferred onto the transfer sheet. In the step of transferring such a toner image, the density of electric charges provided to the transfer sheet has a great influence on the transfer efficiency of the toner image, i.e., image quality.

More specifically, if the transfer sheet has a small electric-charge density, it is weak in toner attraction force. Hence, especially when dry paper is used as the transfer sheet, "scatter" of toner (i.e., spots around line images) may occur. If, on the other hand, it has a large electric-charge density, the toner may be charged to an opposite polarity, and this may cause a "blur" on images transferred, so that images with high-quality cannot be formed on the transfer sheet in some cases. Also, if an entirely black image, i.e. a solid black image, is transferred to the transfer sheet, density non-uniformity may appear or spotlike transfer non-uniformity, such as "sand," may appear on images transferred. Hence, it is desired for the transfer sheet surface to have uniform electric-charge density.

To meet such a demand, a conductive rubber roller is conventionally proposed which has, on the periphery of a conductive mandrel material such as a metal, a rubber layer in which conductive particles (e.g., carbon black, graphite particles, particles of metal oxides such as titanium oxide and silver oxide, powder of metals such as Cu and Ag, and particles made conductive by coating and treating particle surfaces with any of these) have been mixed and dispersed.

However, in the above conductive rubber roller, it is difficult to control resistance value (electrical resistance) of the rubber layer. Dispersion non-uniformity of the conductive particles in the rubber layer may also make the resistance value locally uneven, so that such unevenness may cause charging non-uniformity or may break the photosensitive member because of a partial leak.

To overcome such disadvantages of the conventional conductive rubber roller, a method is proposed in which a charging roller is obtained using, e.g., a polar polymer such as acrylonitrile butadiene rubber (NBR) or an epichlorohydrin type copolymer. A method is further proposed in which these polar polymers are blended so that the conductivity can be optimized.

For example, Japanese Patent Application Laid-Open No. 11-065269 discloses that a conductive rubber roller improved in resistance uniformity and resistance to ozone is obtainable by using a rubber composition obtained by polymerizing NBR having an acrylonitrile content of 18 to 40% by weight and an epichlorohydrin type copolymer having an ethylene oxide content of 10 to 40 mole %, in a proportion of 80:20 to 20:80 in weight ratio.

Japanese Patent Application Laid-Open No. 2001-115005 discloses a roller made to have a low surface frictional resistance and a low volume resistivity by using only a polyether polymer or a blend composition thereof with an ethylenically unsaturated nitrile-conjugated diene type copolymer rubber.

Japanese Patent Application Laid-Open No. 2002-105305 further discloses a conductive rubber roller or conductive rubber belt used in charging rollers, developing rollers, transfer belts or the like of copying machines and so forth, which makes use of a conductive rubber composition in which an ethylene oxide-propylene oxide-allyl glycidyl ether terpolymer containing ethylene oxide, propylene oxide and allyl glycidyl ether in a copolymerization ratio of 50 to 85 mole %, 1 to 49 mole % and 1 to 10 mole %, respectively, and having a number-average molecular weight (Mn) of 10,000 or more is mixed in epichlorohydrin rubber in a weight ratio of 0.01 or more and 4.00 or less. It is stated that this is effective in achieving low volume resistivity, small compression set and less contamination of photosensitive members.

Japanese Patent Application Laid-Open No. 2002-121376 still further discloses a conductive rubber roller or conductive rubber belt making use of a conductive rubber composition in which (A) an ethylene oxide-propylene oxide-allyl glycidyl ether terpolymer containing ethylene oxide, propylene oxide and allyl glycidyl ether in a copolymerization ratio of 50 to 95 mole %, 1 to 49 mole % and 1 to 10 mole %, respectively, and having a number-average molecular weight (Mn) of 10,000 or more is mixed with:

(B) acrylonitrile butadiene rubber; and (C) epichlorohydrin rubber;

in such a way that, representing the weights of the above (A), (B) and (C) by a, b and c, respectively, the following relationship is established:

$$0.01 \leq b/(a+b+c) \leq 0.75; \text{ and}$$

$$0.01 \leq a/c \leq 2.00.$$

Then, the present inventors studied charging members making use of conductive rubber compositions in which various polar polymers according to the above prior art are blended. As a result, they have reached a finding that, in particular, the charging member composed of the conductive rubber composition containing the components (A) to (C) disclosed in the above Japanese Patent Application Laid-Open No. 2002-121376 can provide a preferable charging member having a low and uniform resistance value. However, further research on this charging member revealed that the resistance value of the charging member may vary greatly from its initial value when the charging member is electrified for a long time; hence, the resistance variations of the charging member when used for a long term must be kept small in order to provide high-quality electrophotographic images stably over a long period of time.

SUMMARY OF THE INVENTION

The present invention was made taking account of the above findings. Accordingly, an object of the present invention is to provide a charging member which has uniform charging performance with small resistance non-uniformity, and is small in resistance variation even when used for a long term.

Another object of the present invention is to provide a charging member that has uniform charging performance with small resistance non-uniformity, is small in resistance variation even when used for a long term and, also, hardly sticks to a charging object member even when kept in pressure contact with the charging object member for a long term.

Still another object of the present invention is to provide an image-forming apparatus having such a charging member. A further object of the present invention is to provide a process cartridge having such a charging member.

According to an embodiment of the present invention, there is provided a charging member for charging a surface of a member to be charged in an image-forming apparatus under application of a voltage, the charging member containing a conductive elastic material, wherein the conductive elastic material comprises a polymer, and at least 70% by weight based on the total weight of the polymer is a polar polymer, and wherein the polar polymer primarily comprises (i) acrylonitrile butadiene rubber;

(ii) an ethylene oxide-propylene oxide-allyl glycidyl ether terpolymer; and (iii) a homopolymer of epichlorohydrin; and the weights x, y and z of the respective components (i), (ii) and (iii), having the relationship represented by the following expressions (1) and (2):

$$0.2 \leqq y/(x+y+z) \leqq 0.5 \quad (1)$$

$$4 < y/z \leqq 20 \quad (2).$$

Herein, what is meant by the "polar polymer primarily containing the components (i) to (iii)" is that it contains the components (i) to (iii) in an amount of 70% by weight or more in total, based on the total weight of the polar polymer.

As a preferred embodiment of the present invention, a charging member described in the following item (II) may be cited:

(II) The charging member according to the above (I), wherein the conductive elastic material further contains an ethylene-propylene-diene terpolymer and an ethylene-vinyl acetate copolymer.

The present invention also provides (III) an image-forming apparatus having the above charging member.

As a preferred embodiment of the image-forming apparatus, an image-forming apparatus described in the following item (IV) may be cited:

(IV) The image-forming apparatus according to the above item (III), which comprises an electrophotographic photosensitive member, a charging means for charging the electrophotographic photosensitive member, a means for exposing the electrophotographic photosensitive member thus charged to form an electrostatic latent image thereon, a means for developing the electrostatic latent image to form a toner image, and a transfer means for transferring the toner image directly or indirectly to the surface of an image-bearing member; the transfer means having a means for charging the image-bearing member;

at least one of the charging means and the transfer means having the charging member according to the above item (I) or (II).

The present invention still also provides (V) an image-forming apparatus having, as a means for transferring a toner image to a second image-bearing member from a first image-bearing member holding on its surface a toner image formed by an electrophotographic system, a charging member which applies a potential with a polarity reverse to that of the toner image to the second image-bearing member in the state that the surface of the toner-holding surface of the first image-bearing member and the second image-bearing member are brought in close contact with each other;

the charging member being the charging member according to the above item (I) or (II).

The present invention further provides (VI) a process cartridge which comprises an image-bearing member and the charging member according to the above item (I) or (II) which are integrally supported, and is detachably mountable on the main body of an image-forming apparatus.

DESCRIPTION OF THE PREFERRED EMBODIMENTS

Figure 1:
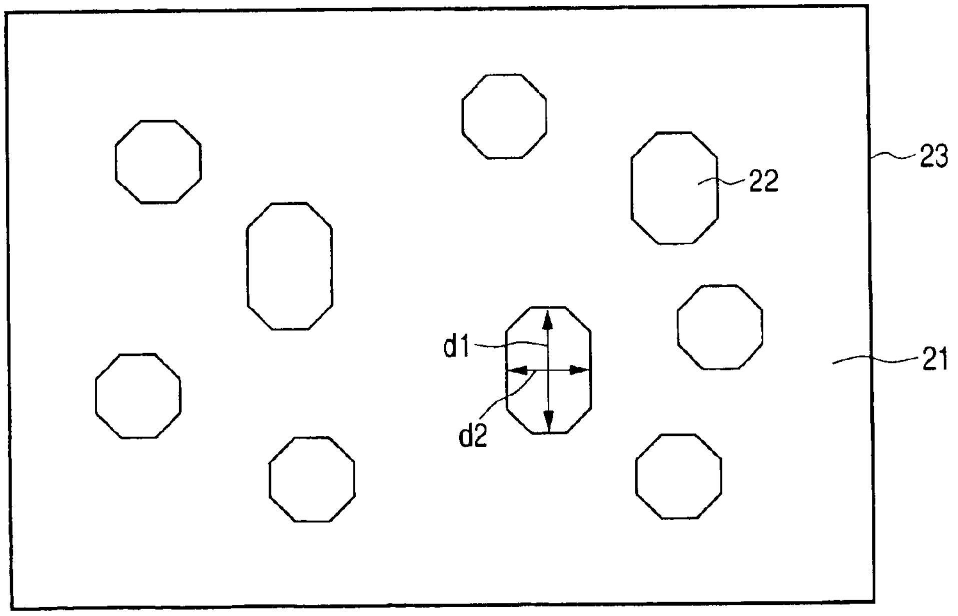
FIG. 1 is a diagrammatic view of a structure observed with a transmission electron microscope, of a conductive elastic material according to an embodiment of the present invention.

As to the reason why the resistance value increases when the charging member disclosed in the above Japanese Patent Application Laid-Open No. 2002-121376 is electrified for a long time, which the present inventors have realized as a problem, the present inventors have presumed as follows: A rubber composition made up of a blend of two or more kinds of polymers commonly has a structure in which, depending on the blend ratio and the compatibility of polymers with each other, domains of one polymer are dispersed in a continuous phase of the other polymer (what is called "islands-in-sea structure"). The present inventors have discovered that the performance of the charging member having a conductive layer containing a blend polymer depends greatly on the properties of the polymers constituting the continuous phase and domain layers, the interfacial strength between the domains and the continuous phase, and so forth. Upon studying parameters of the one disclosed in the above Japanese Patent Application Laid-Open No. 2002-121376, it is described that the component (B) is in an amount of from 1% by weight to 75% by weight based on the total weight of the polymer, which refers to both a case in which the component (B) forms the domains and a case in which the component (B) forms the continuous phase. From this fact, it is evident that any technical ideas of controlling the continuous phase and the domains are not given in the above Japanese Patent Application Laid-open No. 2002-121376.

On the other hand, in the present invention, a component (ii) having the lowest resistance value among the polar polymer consisting of three components (i) to (iii) is used in an amount of 20 to 50% by weight based on the total weight of the polar polymer. In this case, it follows that, as shown diagrammatically in FIG. 1, the component (ii) is present as domains 22 in a continuous phase 21 formed of the component (i). In addition, the proportion of the component (ii) to the component (iii) is set larger than 4 and not more than 20. This has made sufficiently high the interfacial strength between the continuous phase 21 and the domains 22, and also has made it possible for the domains to have an average size as fine as about 1 $\mu$m or less. Probably because such fine domains formed of the component (ii) with a low resistance value are uniformly dispersed in the continuous phase, the charging member has a resistance value as sufficiently low as $10^7$ Ω, and also the variation of the resistance value depending on positions in the charging member can be greatly reduced. Also, because of improvement in interfacial strength between the domains and the continuous phase, the domains are improved in wear resistance, so that the domains do not fall away even when the charging member is used for a long term, and the surface properties of the charging member is not easily changed even when used for a long term. This is considered to inhibit the electrical resistance of the charging member from being changed over time, which is one of the objects of the present invention.

In addition, with the construction of the present invention, deterioration in the component (i) constituting the continuous phase is effectively kept from proceeding in the depth direction. The deterioration of the component (i) takes place when radicals are generated accompanying some double bonds having been cut because of ozone, heat and so forth, and proceeds from the surface toward the interior (the depths) in the manner of a chain reaction, and this brings about variations of resistance value with time. However, in the construction according to the present invention, the deterioration of the component (i) is kept from proceeding to the depths. This is considered to be due to the fact that the domains dispersed uniformly in the continuous phase capture the radicals generated by cutting double bonds in the component (i). This also is considered to greatly contribute to the inhibition of changes in electrical resistance of the charging member according to the present invention when used for a long term.

The charging member according to an embodiment of the present invention is one which is set in an image forming apparatus and charges the surface of a charging object member electrostatically under application of a voltage. The charging member comprises an outermost surface layer containing a conductive elastic material. This conductive elastic material comprises a polymer, and 70% by weight based on the total weight of the polymer is a polar polymer, and the polar polymer primarily comprises (i) acrylonitrile butadiene rubber;

(ii) an ethylene oxide-propylene oxide-allyl glycidyl ether terpolymer; and (iii) a homopolymer of epichlorohydrin.

The weights x, y and z of the components (i), (ii) and (iii), respectively, have the relationship represented by the following expressions (1) and (2):

$$0.2 \leq y/(x+y+z) \leq 0.5 \quad (1)$$

$$4 < y/z \leq 20 \quad (2).$$

The polar polymer preferably primarily comprises the components (i) to (iii), and specifically comprises the components (i) to (iii) in an amount of 70% by weight or more in total, based on the total weight of the polar polymer. As a result, the conductive elastic material can hold a conductivity which is preferably used for charging members for use in electrophotography.

In the polymer mixture system of the components (i) to (iii), constituting the main part of the polar polymer, the component (i) constitutes a continuous phase, and the component (ii) constitutes domains dispersed in the continuous phase. The component (iii) functions as a compatibilizer of the components (i) and (ii), and so acts as to enhance the interfacial strength between the domains and the continuous phase.

The above expression (1) defines the proportion of the ethylene oxide-propylene oxide-allyl glycidyl ether terpolymer, having the highest conductivity, based on the total weight of the polar polymer (i) to (iii) in the conductive elastic material.

Controlling the value of y/(x+y+z) within the range of from 0.2 to 0.5 can make the charging member have a sufficiently low resistance value at a level of, e.g., $10^7$ Ω. If the value of y/(x+y+z) is smaller than 0.2, it is difficult to make the resistance value sufficiently small for use as a charging member. If it is larger than 0.5, the component (ii) tends to constitute the continuous phase, and the component (i) the domains. In such a case, since the component (ii) is a very hard polymer, it may scratch or wear the charging object member when used in the charging member. It may also be inferior in being worked into the charging member.

The above expression (2) defines the ratio of the component (ii) to the component (iii). Controlling this value within the range of more than 4 (4 is not included) to 20 or less (20 is included) enables the charging member to have a highly uniform resistance value. Also, probably because of an improvement in interfacial strength between the domains formed of the component (ii) and the continuous phase formed of the component (i), the charging member can be improved in wear resistance. If the value of y/z is 4 or less, the domains formed of the component (iii) may come to be present in the component (i) continuous phase in a large number, resulting in low durability in the charging member because the domains themselves formed of the component (iii) have insufficient wear resistance. Further, if the value of y/z is more than 20, the domains formed of the component (ii) have an average size of more than 1 $\mu$m, which tends to make the resistance value nonuniform. Moreover, the amount of the component (iii) that functions as a compatibilizer becomes relatively small with respect to the amount of the component (ii); hence, the interfacial strength between the component (i) continuous phase and the component (ii) domains is insufficient, causing insufficient wear resistance of the domains formed of the component (ii), thereby resulting in low durability in the charging member.

Satisfaction of the above expressions (1) and (2) effectively keeps the acrylonitrile butadiene rubber (NBR), constituting the continuous phase, from deteriorating. The component (i), constituting the conductive elastic material, commonly deteriorates gradually from the surface toward the bottom of a conductive elastic layer the conductive elastic material forms because of ozone and heat. However, in the case of the conductive elastic material having the composition in which the component (ii) fine domains stand dispersed in the component (i) continuous phase, which is obtained as a result of the satisfaction of the above expressions (1) and (2), it is considered that the radicals produced in the conductive elastic layer by the action of the ozone and heat, which are the causes of deterioration of the component (i), are captured by the domains, so that the chain reaction due to the radicals is restrained.

Thus, by satisfying the above expressions (1) and (2), a charging member having a low and uniform resistance value and very good long-term durability can be realized.

The above components (i) to (iii) polymers are detailed below.

(i) Acrylonitrile butadiene rubber:

The acrylonitrile butadiene rubber may include one having structural units represented by the following chemical formulas (A-1) and (A-2):

$$-[CH_2CH(CN)]- \quad \text{(A-1)}$$

$$-[CH_2CH{=}CHCH_2]- \quad \text{(A-2)}.$$

The copolymerization ratio (molar ratio) of (A-1) and (A-2) may be from 15:85 to 60:40, and preferably from 20:80 to 46:54.

(ii) Ethylene oxide-propylene oxide-allyl glycidyl ether terpolymer:

The ethylene oxide-propylene oxide-allyl glycidyl ether terpolymer may include one having structural units represented by the following chemical formulas (B-1), (B-2) and (B-3):

$$-[CH_2CH_2O]- \quad \text{(B-1)}$$

$$-[CH_2CH(CH_3)O]- \quad \text{(B-2)}$$

$$-[CH_2CH(CH_2OCH_2CH{=}CH_2)O]- \quad \text{(B-3)}.$$

The copolymerization ratio (molar ratio) of (B-1), (B-2) and (B-3) may be (B-1): 50 to 98%, (B-2): 1 to 30% and (B-3): 1 to 20%, and preferably (B-1): 70 to 98%, (B-2): 1 to 25% and (B-3): 2 to 15%.

(iii) Homopolymer of epichlorohydrin:

The homopolymer of epichlorohydrin may include one having a structural unit represented by the following chemical formula (C-1):

$$-[CH_2CH(CH_2Cl)O]- \text{(C-1)}.$$

Figure 2:
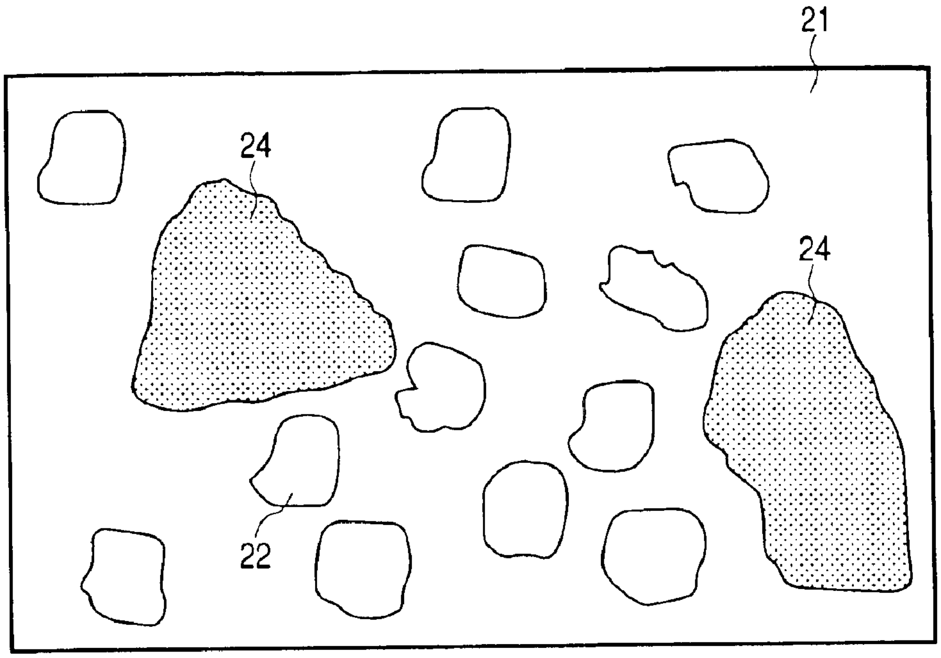
FIG. 2 is a diagrammatic view of a structure observed with a transmission electron microscope, of a conductive elastic material according to another embodiment of the present invention.

The conductive elastic material according to the present invention may contain a non-polar polymer in an amount of less than 30% by weight based on the total weight of the polymer in the conductive elastic material. The non-polar polymer refers to a high polymer having no large dipole in the molecule, which is commonly a high polymer having a small dielectric constant. Such a non-polar polymer may specifically include NR (IR) (isoprene rubber), BR (butadiene rubber), SBR (styrene-butadiene rubber), EPDM (ethylene-propylene-diene terpolymer), IIR (butyl rubber, or isobutylene-isoprene rubber), olefin elastomers, SEBS elastomers, and polystyrene elastomers. The blending of any of these polymers enables the charging member to be effectively kept from sticking to the charging object member such as a photosensitive member, and also can accurately control the resistance value so as to be applied to various ways of using electrical resistance in an electrophotographic apparatus.

Where the non-polar polymer as described above is added in an amount of less than 30% by weight based on the total weight of the polymer in the conductive elastic material, the non-polar polymer comes to be present as domains 24 in the component (i) continuous phase 21 as shown in FIG. 2. This is considered to provide accurate control of the resistance value and the prevention of sticking to the charging object member. In this regard, the domains 24 preferably have an average size of less than 10 $\mu$m in order to prevent the resistance of the charging member surface from becoming nonuniform. Here, in order to make the non-polar polymer have a small average domain size, it is preferable to mix a compatibilizer. In the case where EPDM is used as the non-polar polymer, it is preferable to use as the compatibilizer any of an ethylene-vinyl acetate copolymer and graft copolymers thereof, an ethylene-ethyl acrylate copolymer and graft copolymers thereof, an ethylene-glycidyl methacrylate copolymer and grafted copolymers thereof, and the like. These additives may be added in an amount of from 1 part by weight to 30 parts by weight based on the total weight of the non-polar polymer. As long as it is added within this range, the domain size can be so made as to be the above size, without significantly affecting the resistance value of the charging member.

In order to achieve more improvement in ozone resistance and aging resistance of the charging member, it is preferable to use EPDM as the non-polar polymer. In particular, where the polar polymer is vulcanized with sulfur, it is suited for the EPDM used to have an iodine value (a value measured by the Wijs method) of 20 or more, and preferably 30 or more, in view of co-vulcanizability. Here, the EPDM preferably used has an ethylene-propylene copolymerization ratio (in weight ratio) of ethylene: 45 to 80%, propylene: 20 to 55% and diene: 3 to 15%, and more preferably ethylene: 50 to 70%, propylene: 30 to 50% and diene: 5 to 11%.

In respect of the image-forming apparatus and process cartridge according to the present invention, the present invention is described below in greater detail with reference to the drawings.

Figure 3:
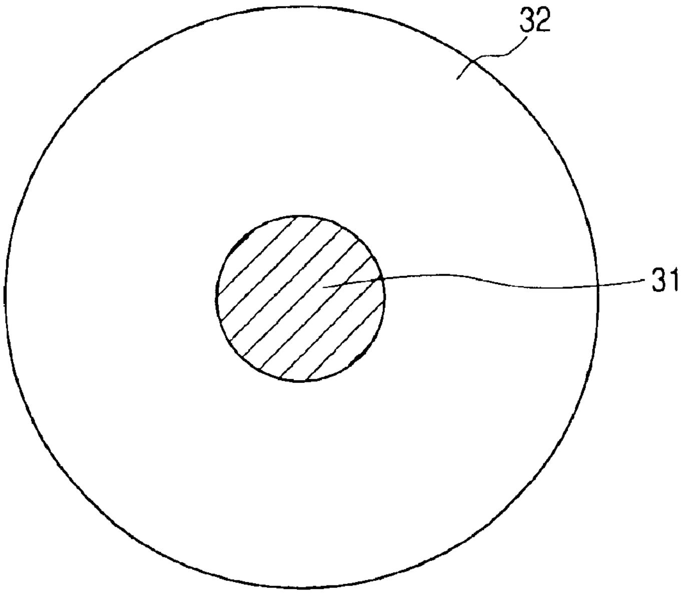
FIG. 3 illustrates the charging member according to the present invention.

FIG. 3 is a diagrammatic sectional view showing an example of the charging member according to the present invention. A conductive elastic material layer 32 is provided on a cylindrical conductive substrate 31, e.g., made of a metal.

Where the charging member according to the present invention is used as a transfer roller, it is sufficient if the conductive elastic material layer is one which can apply a transfer bias voltage to the paper and has an electrical resistance to the extent that uniform pressure contact with the paper is made possible. It may preferably be one having a resistance value of approximately from $1\times10^5\Omega$ to $1\times10^{12}\Omega$.

The conductive elastic material layer may also preferably have a low hardness in order to secure a sufficient nip width between the transfer roller and the charging object member, to achieve uniform charging and, particularly in the case of a transfer member, to prevent "blank areas" in which middle areas of line images are blank. It may preferably have a hardness (Asker C) of from 20° to 80°. For the achievement of such a low hardness, a method may be used in which liquid NBR or the like having good compatibility with nitrile rubber is added, or a means may be used in which the conductive elastic material layer is formed of a foam.

Figure 4:
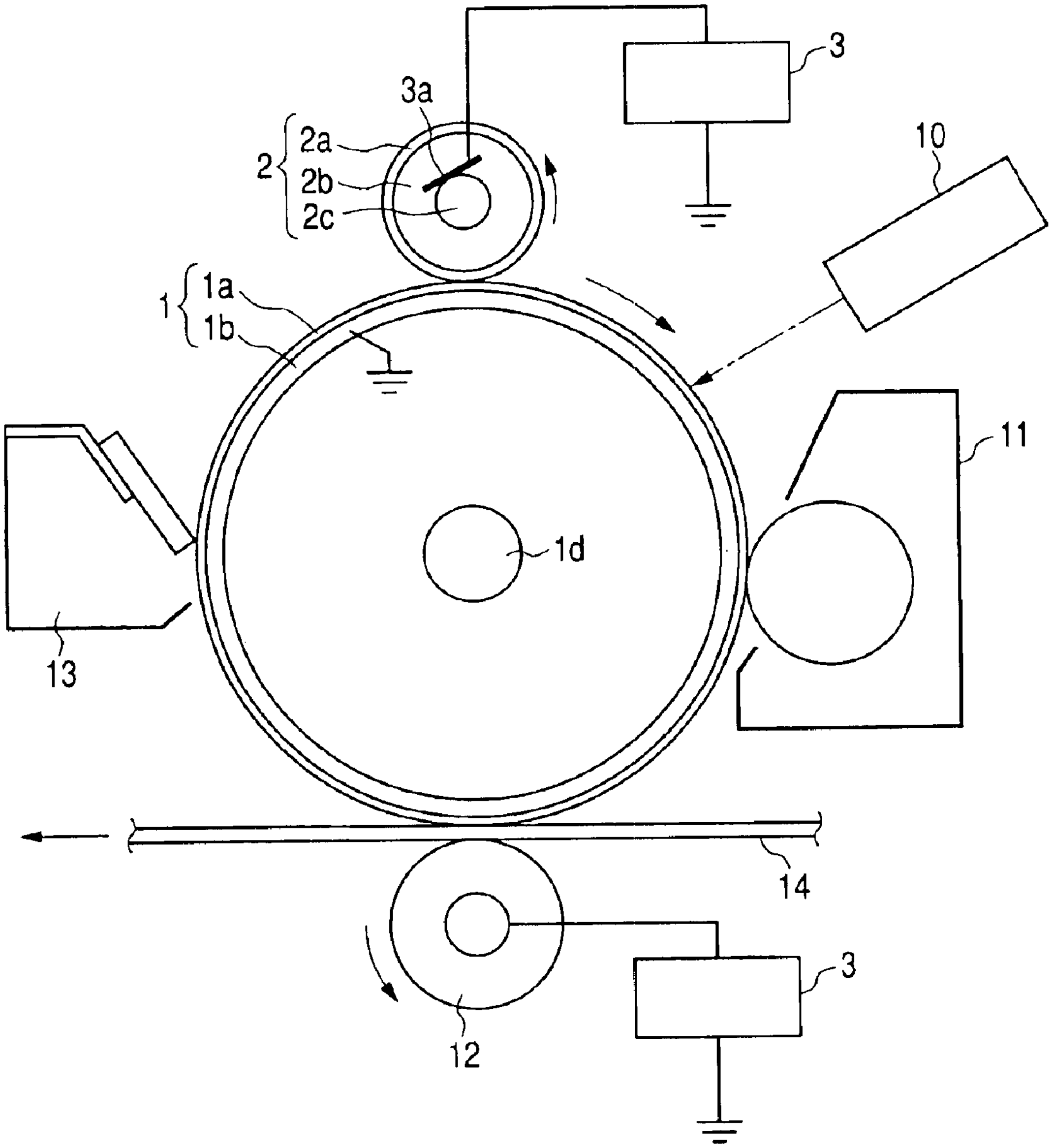
FIG. 4 is a schematic view showing the construction of an electrophotographic apparatus making use of the charging member according to the present invention.

FIG. 4 is a schematic cross-sectional view showing the construction of an electrophotographic apparatus making use of the charging member according to the present invention. Reference numeral 1 denotes an image-bearing member as a charging object member. The one in this example is a drum type electrophotographic photosensitive member having as basic constituent layers a conductive substrate layer 1*b* formed of aluminum or the like and a photoconductive layer (photosensitive layer) 1*a* formed on the peripheral surface thereof. It is rotatively driven around an axis 1*d* in the clockwise direction as viewed on the drawing, at a state peripheral speed.

Reference numeral 2 denotes a charging member that is in contact with the surface of the photosensitive member 1, uniformly primarily charges the surface of the photosensitive member to a stated polarity and potential, and is required to have uniform conductivity. In this example, it is of a roller type, i.e., a charging roller. The charging roller consists of a center mandrel 2*c*, a conductive elastic material layer 2*b* (a lower-layer) formed thereon, and an upper-layer resistance layer 2*a* further formed thereon. The charging roller is pressed against the photosensitive member 1 by the application of pressure at both ends of the mandrel 2*c* by means of a pressure means (not shown), and is driven following the rotation of the photosensitive member 1. The material (conductive elastic material) of the present invention is used in the conductive elastic material layer. It is also effective when used in the resistance layer 2*a*.

Thus, a stated direct-current (DC) bias or direct-current plus alternating-current (AC +DC) bias is applied from a power source 3 to the mandrel 2*c* through a rubbing-friction electrode 3*a*, whereupon the peripheral surface of the photosensitive member 1 being rotated is contact-charged to a stated polarity and potential. The peripheral surface of the photosensitive member 1 having been subjected to uniform charging by means of the charging member 2 is subsequently subjected to exposure (e.g., laser beam scanning exposure, or slit exposure of images of an original) according to intended image information by means of an exposure means 10, whereupon electrostatic latent images corresponding to the image information are formed on the peripheral surface of the photosensitive member 1.

The electrostatic latent images are then successively developed into visible images as toner images by a developing means 11. The toner images are then successively transferred by a transfer means 12 to the surface of a transfer material 14 transported from a paper feed means (not shown) to a transfer zone between the photosensitive member 1 and the transfer means 12 at proper timing in such a manner as synchronized with the rotation of the photosensitive member 1.

The transfer means 12 in this example is a transfer roller, which is charged to a polarity reverse to that of toner from the back of the transfer material 14, whereupon the toner images on the photosensitive member 1 surface side are transferred onto the transfer material 14 surface side.

The transfer material 14 to which the toner images have been transferred is separated from the surface of the photosensitive member 1 and then transported to an image-fixing means (not shown), where the toner images are fixed. The transfer material with fixed images is put out of the apparatus as an image-formed matter. Where images are also formed on the back, the transfer material 14 with fixed images is transported to a means for re-transport (not shown) to the transfer zone. The surface of the photosensitive member 1 from which the toner images have been transferred is cleaned by a cleaning means 13 to remove adherent contaminants such as transfer residual toner. The surface having been thus cleaned is repeatedly used for image formation.

Besides the roller type member set in the image-forming apparatus of the example shown in FIG. 4, as the means for charging the image-bearing member (photosensitive member) 1, the charging member 2 may also be constructed in a form such as a blade type, a block type or a belt type. The roller type charging member 2 may be driven following the rotation of the photosensitive member 1, or may be set unrotatable, or may be positively rotated at a stated peripheral speed in the forward direction or backward direction in respect to the surface movement direction of the photosensitive member 1. The charging member according to the present invention is used as the charging member 2 and/or the transfer means 12.

As the electrophotographic apparatus, it may also be constituted of a combination of a plurality of components integrally joined as a process cartridge from among the constituents such as the above electrophotographic photosensitive member, developing means and cleaning means so that the process cartridge is detachably mountable on the main body of the electrophotographic apparatus such as a copying machine or a laser beam printer. For example, at least one of the developing means and the cleaning means may integrally be supported in a cartridge together with the photosensitive member 1 and the charging member to form a process cartridge that is detachably mountable on the main body of the apparatus through a guide means such as rails provided in the main body of the image forming apparatus. The charging member and/or the developing means may be provided to the process cartridge.

In the case where the electrophotographic apparatus is used as a copying machine or a printer, the imagewise exposure is performed by using light reflected from, or transmitted through, an original, or by scanning a laser beam, driving an LED array or driving a liquid crystal shutter array according to signals obtained by reading an original.

The photosensitive member is provided on a conductive support. As the conductive support, a support having conductivity in itself is usable, as exemplified by metals such as aluminum, an aluminum alloy, stainless steel and nickel. Also usable are plastic or glass having a conductive layer formed by vacuum deposition of aluminum, an aluminum alloy, an indium oxide-tin oxide alloy or the like.

A subbing layer having a function as a barrier and the function of adhesion may be provided between the conductive support and the photosensitive layer.

The subbing layer may be formed of, e.g., casein, polyvinyl alcohol, nitrocellulose, an ethylene-acrylic acid copolymer, an amide (e.g., nylon 6, nylon 66, nylon 610 or a copolymer nylon), polyurethane, gelatin or aluminum oxide. The subbing layer may preferably have a layer thickness of 5 $\mu$m or less, and preferably from 0.5 to 3 $\mu$m. The subbing layer may preferably have an electrical resistance value (volume resistivity) of $1\times10^7$ Ω·cm in order to exhibit its function.

The photosensitive layer may be formed by applying an organic or inorganic photoconductive material optionally together with a binder resin. It may also be formed by vacuum evaporation. As a form of the photosensitive layer, a function-separated type photosensitive layer is preferred which has a charge generation layer and a charge transport layer.

The charge generation layer may be formed by vacuum evaporation of a charge-generating material such as an azo dye, a phthalocyanine pigment or a quinone pigment or by applying the same together with a binder resin (the binder is optional). The charge generation layer may preferably have a layer thickness of from 0.01 $\mu$m to 30 $\mu$m, and particularly preferably from 0.05 $\mu$m to 2 $\mu$m.

The charge transport layer may be formed by applying a solution prepared by dissolving a charge-transporting material such as a hydrazone compound, a styryl compound, an oxazole compound or a triarylamine compound in a binder resin having film-forming properties. The charge transport layer may preferably have a layer thickness of from 5 $\mu$m to 50 $\mu$m, and particularly preferably from 10 $\mu$m to 30 $\mu$m.

A protective layer may be formed on the photosensitive layer in order to prevent aging due to ultraviolet rays and so forth and improve wear resistance.

As described above, according to the present invention, a charging member can be obtained which can achieve uniform charging performance with small resistance non-uniformity, is small in resistance variation when used for a long term, and has superior wear resistance.

According to the present invention, a charging member can also be obtained which, in addition to the above effect, can not easily stick to a charging object member even when kept in pressure contact with the charging object member for a long term.

According to the present invention, an image-forming apparatus and a process cartridge can further be obtained which can stably form high-grade images over a long period of time.

EXAMPLES

The present invention is described below in greater detail by giving Examples and with reference to the drawings. The present invention is by no means limited by these examples. In principle, "part(s)" refers to "part(s) by weight".

Example 1

A transfer roller having the construction shown in FIG. 3 was produced by the following procedure.

A conductive cylindrical substrate (mandrel) 31 of 8 mm in diameter, made of stainless steel, was prepared for use. Also, as materials for the conductive elastic material layer 32, the following materials were mixed by means of a pressure kneader.

NBR (nitrile content: 33.5%) (trade name: NIPOL DN214; available from Nippon Zeon Co., Ltd.) 76 parts
Alkyl ether polymer (trade name: ZSN8030; available from Nippon Zeon Co., Ltd.) 20 parts
Epichlorohydrin rubber (trade name: EPICHLOMER H; available from Daiso K.K.) 4 parts
Zinc oxide 5 parts
Stearic acid 2 parts
Hydrotalcite 3 parts
Calcium carbonate 20 parts The NBR used in the above has as monomer units the units represented by the chemical formulas (A-1) and (A-2). The copolymerization ratio (molar ratio) of units (A-1) and (A-2) is 33.5:66.5. Also, the alkyl ether polymer is an ethylene oxide-propylene oxide-allyl glycidyl ether terpolymer, and contains as monomer units the units represented by the chemical formulas (B-1), (B-2) and (B-3); the molar ratio of these monomer units being 90:6:4. Further, the epichlorohydrin rubber is a homopolymer of epichlorohydrin, composed of the monomer unit represented by the chemical formula (C-1).

To the resulting mixture, the following materials were further added and mixed by means of an open roll.

Sulfur 1 part
Mercaptobenzothiazole (vulcanization accelerator) 1 part
Dibenzothiazolyl disulfide 2 parts
Tetraethylthiuram disulfide 2 parts
Dipentamethylenethiuram terasulfide 1 part
Quinoxaline (XL21) 1 part
Azodicarbondiamide (blowing agent) 4 parts
Oxybisbenzenesulfonyl hydrazide 12 parts
Urea resin as auxiliary agent 1 part The resulting rubber was formed into a tube by extrusion. The tube having been extruded did not get out of shape, and the die swelling was stable also in continuous extrusion, showing no dimensional variations. This tube was primarily vulcanized at 160° C. for 30 minutes by steam vulcanization, and further secondarily vulcanized at 160° C. for 2 hours by means of an electric furnace to obtain a tubular conductive elastic material layer. This tubular conductive elastic material layer was press-fitted to the above mandrel, having been coated with an adhesive, followed by polishing to obtain a charging roller of 17 mm in diameter, having the conductive elastic material layer 41 (as depicted in FIG. 5) on the peripheral surface of the mandrel.

Figure 5:
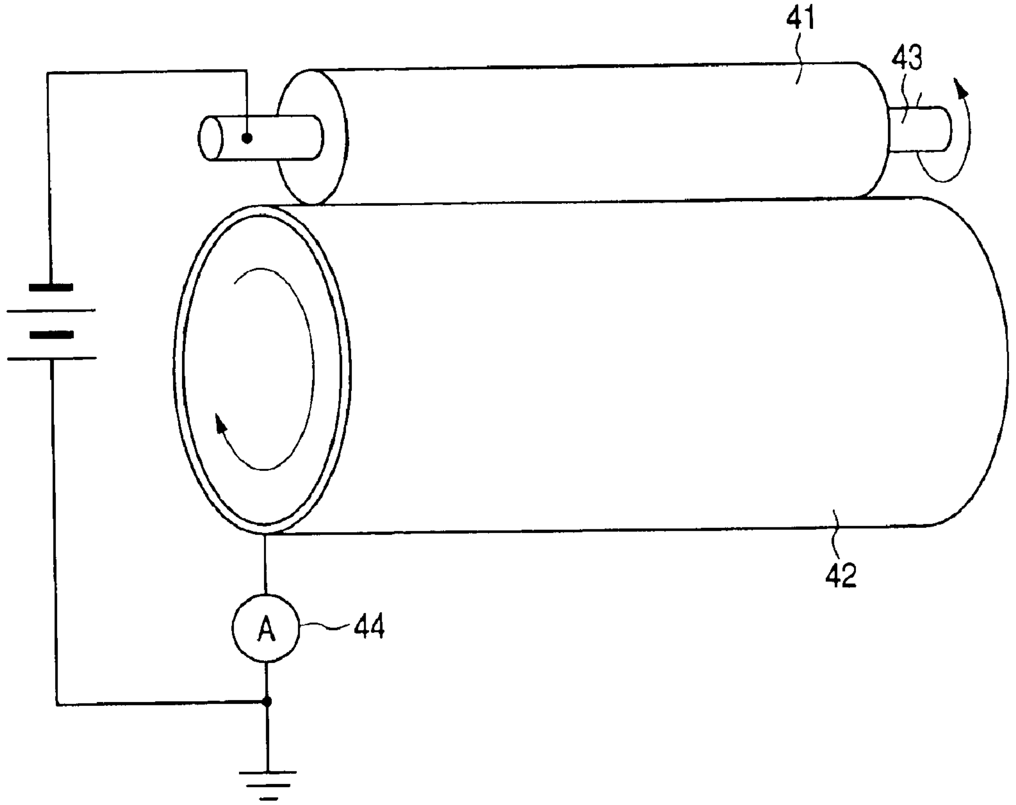
FIG. 5 illustrates the construction of an instrument for measuring resistance values of a charging roller.

The resistance value of the charging roller thus obtained was measured with an instrument shown in FIG. 5, and was measured rotating an aluminum drum 42 under application of a load of 500 g each to both ends of a conductive mandrel 43 of the charging roller. Reference numeral 44 denotes an ammeter. The electrical resistance value of the roller was found to be $8.31\times10^7$ Ω under application of a direct-current voltage of 2 kV, after it was left standing in a 25° C. and 50% RH environment for 24 hours. The value of maximum/minimum during one rotation was 1.04. The hardness was 31.5° Asker C.

The structure of a conductive elastic material layer produced in the same manner as the above was also observed using a transmission electron microscope, and found to have a structure in which domains formed of the alkyl ether polymer stood dispersed in a continuous phase formed of the NBR. The domains were an average size of 0.38 $\mu$m, and their average distance was 0.26 $\mu$m. As a result of elementary analysis made on the conductive elastic material layer by energy dispersive X-ray spectroscopy, no region was seen in which the concentration of chlorine atoms was locally high. From this fact, it is considered that no domain is present which is formed of epichlorohydrin rubber.

The average size of the domains is observed in the following way: From a conductive elastic material layer produced by the same procedure as the above, an ultrathin section is prepared in a thickness of about 50 nm using a Cryomicrotome. Upon dyeing the ultrathin section with osmium tetraoxide, the NBR is dyed. This is observed using a transmission electron microscope at 10,000 magnifications. In respect of domains included completely in a visual field 23 (FIG. 1) viewed from a photograph with a visual field size of 10 $\mu$m×7 $\mu$m, the length and width are measured, and the value of (length+width)/2 is regarded as the size of each domain, and an average value of the sizes thus obtained is regarded as an average size of the domains. Herein, as to the length and width, as shown in FIG. 1, the maximum diameter in the domain major-axis direction is regarded as the length (d1); and the maximum diameter in the minor-axis direction that intersects with the major axis perpendicularly, as the width (d2). As a specific method for measuring the domain size, a negative film of an electron microscope image is read with a film scanner (LS-4500FA, manufactured by Nikon) at a resolution of 1,200 dpi. The image thus read is measured with IMAGE-PRO PLUS (manufactured by Planetron Inc.), where islands of 0.002 μm or smaller are excluded from measurement because the resolution of images is 0.002 μm/pixel. The islands of 0.002 μm or smaller have no great influence on the roller function.

The average distance between domains is a value obtained by averaging the closest distances between adjacent domains measured on optionally selected 100 spots by using the above photograph.

The charging roller obtained as described above was set as the transfer roller in the electrophotographic apparatus, trade name: LASER JET 9000; manufactured by Hewlett-Packard Co. Using this electrophotographic apparatus, entirely black images, solid black images, were formed on dry paper in a 25° C. and 50% RH environment, and the images formed were evaluated.

As a result, the entirely black images formed on dry paper were found to be of very high grade in visual evaluation.

Further, extensive-operation performance (running performance) in a continuous 500,000-sheet paper feed was evaluated and it was found that faulty images did not appear, although a rise in resistance value was seen on the order of 0.09 (log(resistance after running/initial resistance)) with respect to the resistance value before running.

Next, an unused product of the charging roller according to this Example was left standing for 2 weeks in a 40° C. and 95% RH environment under pressure contact with an organic photosensitive member at a load of 1 kg in total pressure. As a result, it slightly stuck to the photosensitive member surface at the roller edges. However, this did not affect at all the grade of electrophotographic images when this charging roller was set as the transfer roller in the above electrophotographic apparatus and images were formed.

Example 2

A charging roller was obtained in the same manner as in Example 1 except that the NBR, the epichlorohydrin rubber and the alkyl ether polymer were used in amounts of 64 parts, 6 parts and 30 parts, respectively. The resistance value of the charging roller obtained was found to be $2.80\times10^7$ Ω. The value of maximum/minimum during one rotation was 1.04. The hardness was 32.0° Asker C.

The structure of the conductive elastic material layer according to this Example was also observed using a transmission electron microscope in the same manner as in Example 1, and found to have a structure in which domains formed of the alkyl ether polymer stood dispersed in a continuous phase formed of the NBR. The domains were an average size of 0.45 μm, and their average distance was 0.25 μm.

The above charging roller was set as the transfer roller in the electrophotographic apparatus and evaluated in the same manner as in Example 1. As a result, good images were obtained. The extensive-operation performance (running performance) in a continuous 500,000-sheet paper feed was evaluated and it was found that faulty images did not appear, although a rise in resistance value was seen on the order of 0.07 (log(resistance after running/initial resistance)) with respect to the resistance value before running.

Next, an unused product of the charging roller according to this Example was left standing for 2 weeks in a 40° C. and 95% RH environment under pressure-contact with an organic photosensitive member at a load of 1 kg in total pressure. As a result, it slightly stuck to the photosensitive member surface at the roller edges. However, this did not affect at all the grade of electrophotographic images when this charging roller was set as the transfer roller in the above electrophotographic apparatus and images were formed.

Example 3

A charging roller was obtained in the same manner as in Example 1 except that the NBR, the epichlorohydrin rubber and the alkyl ether polymer were used in amounts of 40 parts, 10 parts and 50 parts, respectively. The resistance value of this charging roller was found to be $7.81\times10^6$ Ω. The value of maximum/minimum during one rotation was 1.05. The hardness was 34.0° Asker C.

The conductive elastic material layer according to this Example was observed using a transmission electron microscope in the same manner as in Example 1, and it was found that the NBR constituted a continuous phase and the alkyl ether polymer constituted domains. The domains were an average size of 0.82 μm, and their average distance was 0.32 μm.

The above charging roller was set as the transfer roller in the electrophotographic apparatus and the entirely black images, solid black images, were evaluated in the same manner as in Example 1. As a result, good images were obtained. The extensive-operation performance (running performance) in a continuous 500,000-sheet paper feed was evaluated and it was found that faulty images did not appear, although a rise in resistance value was seen on the order of 0.05 (log(resistance after running/initial resistance)) with respect to the resistance value before running.

Next, an unused product of the charging roller according to this Example was left standing for 2 weeks in a 40° C. and 95% RH environment under pressure contact with an organic photosensitive member at a load of 1 kg in total pressure. As a result, it slightly stuck to the photosensitive member surface at the roller edges. However, this did not affect at all the grade of electrophotographic images when this charging roller was set as the transfer roller in the above electrophotographic apparatus and images were formed.

Example 4

A charging roller was obtained in the same manner as in Example 1 except that the NBR, the epichlorohydrin rubber and the alkyl ether polymer were used in amounts of 64 parts, 2 parts and 34 parts, respectively. The resistance value of the charging roller obtained was found to be $2.63\times10^7$ Ω. The value of maximum/minimum during one rotation was 1.04. The hardness was 32.0° Asker C.

The conductive elastic material layer according to this Example was observed using a transmission electron microscope in the same manner as in Example 1, and it was found that the NBR constituted a continuous phase and the alkyl ether polymer constituted domains. The domains were an average size of 0.58 μm, and their average distance was 0.28 μm.

The above charging roller was set as the transfer roller in the electrophotographic apparatus and evaluated in the same manner as in Example 1. As a result, good images were obtained. The extensive-operation performance (running performance) of a continuous 500,000-sheet paper feed was evaluated and it was found that faulty images did not appear, although a rise in resistance value was seen on the order of 0.06 (log(resistance after running/initial resistance)) with respect to the resistance value before running.

Next, an unused product of the charging roller according to this Example was left standing for 2 weeks in an environment of 40° C. and 95% RH under pressure contact with an organic photosensitive member at a load of 1 kg in total pressure. As a result, it slightly stuck to the photosensitive member surface at the roller edges. However, this did not affect at all the grade of electrophotographic images when this charging roller was set as the transfer roller in the above electrophotographic apparatus and images were formed.

Comparative Example 1

A charging roller was obtained in the same manner as in Example 1 except that the NBR, the alkyl ether polymer and the epichlorohydrin rubber were used in amounts of 64 parts, 36 parts and 0 part, respectively. The resistance value of the charging roller obtained was found to be $2.25 \times 10^7$ Ω. The value of maximum/minimun during one rotation was 1.16. The hardness was 31.1° Asker C.

The conductive elastic material layer according to this Comparative Example was also observed using a transmission electron microscope in the same manner as in Example 1, and it was found that the NBR constituted a continuous phase and the alkyl ether polymer constituted domains. The domains were an average size of 0.79 μm, and their average distance was 0.43 μm.

The above charging roller was set as the transfer roller in the electrophotographic apparatus and evaluated in the same manner as in Example 1. As a result, good images were obtained. The extensive-operation performance (running performance) in a continuous 500,000-sheet paper feed was evaluated and it was found that faulty images appeared on the 350,000th sheet and following sheets because of a rise in resistance value on the order of 0.2 (log(resistance after running/initial resistance)) with respect to the resistance value before running. This is considered to be due to the following: The conductive elastic material layer according to this Comparative Example does not contain the epichlorohydrin rubber that functions as a compatibilizer between the NBR constituting the continuous phase and the alkyl ether polymer constituting the domains. Hence, the interfacial strength between the continuous phase and the domains is not sufficient and the domains wear with the progress of the running test, so that the surface properties of the charging roller change causing great variations of the resistance value with respect to the initial value.

Next, an unused product of the charging roller according to this Comparative Example was left standing for 2 weeks in a 40° C. and 95% RH environment under pressure contact with an organic photosensitive member at a load of 1 kg in total pressure. As a result, it slightly stuck to the photosensitive member surface at the roller edges. However, this did not affect the grade of electrophotographic images when this charging roller was set as the transfer roller in the above electrophotographic apparatus and images were formed.

Comparative Example 2

A charging roller was obtained in the same manner as in Example 1 except that the NBR, the epichlorohydrin rubber and the alkyl ether polymer were used in amounts of 82 parts, 3 parts and 15 parts, respectively. The resistance value of the charging roller obtained was found to be $1.20 \times 10^8$ Ω. The value of maximum/minimum during one rotation was 1.03. The hardness was 31.0° Asker C.

The conductive elastic material layer according to this Comparative Example was observed using a transmission electron microscope in the same manner as in Example 1, and it was found that the NBR constituted a continuous phase and the alkyl ether polymer constituted domains. The domains were an average size of 0.32 μm, and their average distance was 0.24 μm.

The above charging roller was set as the transfer roller in the electrophotographic apparatus and evaluated in the same manner as in Example 1. As a result, image disorder occurred which was caused by relatively high roller resistance. The extensive-operation performance (running performance) in a continuous 500,000-sheet paper feed was evaluated and it was found that faulty images appeared on the 250,000th sheet and following sheets because of a rise in resistance value on the order of 0.2 (log(resistance after running/initial resistance)) with respect to the resistance value before running.

Comparative Example 3

A charging roller was obtained in the same manner as in Example 1 except that the NBR, the epichlorohydrin rubber and the alkyl ether polymer were used in amounts of 34 parts, 11 parts and 55 parts, respectively. The resistance value of the charging roller obtained was found to be $6.30 \times 10^6$ Ω. The value of maximum/minimum during one rotation was 1.07. The hardness was 36.0° Asker C.

The conductive elastic material layer according to this Comparative Example was also observed using a transmission electron microscope in the same manner as in Example 1, and found to have a structure in which the NBR and the alkyl ether polymer blended with each other in layer form and did not have the structure in which domains stood dispersed in a continuous phase.

The above charging roller was set as the transfer roller in the electrophotographic apparatus and evaluated in the same manner as in Example 1. As a result, image disorder occurred under the influence of local changes in resistance value of the roller. The extensive-operation performance (running performance) in a continuous 500,000-sheet paper feed was evaluated and it was found that faulty images appeared on the 350,000th sheet and following sheets because of a rise in resistance value which was seen on the order of 0.2 (log(resistance after running/initial resistance)) with respect to the resistance value before running.

Comparative Example 4

A charging roller was obtained in the same manner as in Example 1 except that the NBR, the epichlorohydrin rubber and the alkyl ether polymer were used in amounts of 60 parts, 10 parts and 30 parts, respectively. The resistance value of the charging roller obtained was found to be $4.38 \times 10^7$ Ω. The value of maximum/minimum during one rotation was 1.07. The hardness was 30.0° Asker C.

The conductive elastic material layer according to this Comparative Example was also observed using a transmission electron microscope in the same manner as in Example 1, and found that the NBR constituted a continuous phase, and the alkyl ether polymer and a part of the epichlorohydrin rubber constituted domains. The domains were an average size of 0.40 μm, and their average distance was 0.25 μm.

The above charging roller was set as the transfer roller in the electrophotographic apparatus and evaluated in the same manner as in Example 1. As a result, good images were obtained. The extensive-operation performance (running performance) in a continuous 500,000-sheet paper feed was evaluated and it was found that faulty images appeared on the 450,000th sheet and following sheets because of a rise in resistance value on the order of 0.2 (log(resistance after running/initial resistance)) with respect to the resistance value before running. This is considered to be caused by the fact that domains formed of epicholohydrin rubber are insufficient in wear resistance.

Next, an unused product of the charging roller according to this Comparative Example was left standing for 2 weeks in a 40° C. and 95% RH environment under pressure contact with an organic photosensitive member at a load of 1 kg in total pressure. As a result, it slightly stuck to the photosensitive member surface at the roller edges. However, this did not affect at all the grade of electrophotographic images when this charging roller was set as the transfer roller in the above electrophotographic apparatus and images were formed.

Comparative Example 5

A charging roller was obtained in the same manner as in Example 1 except that the NBR, an ethylene oxide-epichlorohydrin-allyl glycidyl ether terpolymer in a molar ratio of 56:40:4 with an average molecular weight of 140,000 (trade name; EPICHLOMER CG102; available from Daiso K.K.) as the epichlorohydrin rubber and the alkyl ether polymer were used in amounts of 64 parts, 6 parts and 30 parts, respectively. The resistance value of the charging roller obtained was found to be $1.28\times10^7$ Ω. The value of maximum/minimum during one rotation was 1.10. The hardness was 31.0° Asker C.

In observation using a transmission electron microscope, the NBR constituted a continuous phase and part of the epichlorohydrin rubber constituted domains. The domains were an average size of 1.2 μm, and their average distance was 0.33 μm.

The above charging roller was set as the transfer roller in the electrophotographic apparatus and evaluated in the same manner as in Example 1. As a result, good images were obtained. The extensive-operation performance (running performance) in a continuous 500,000-sheet paper feed was evaluated and it was found that faulty images appeared on the 250,000th sheet and following sheets because of a rise in resistance value on the order of 0.2 (log(resistance after running/initial resistance)) with respect to the resistance value before running. This is considered to be caused by the fact that a copolymer, not a homopolymer, was used as the epichlorohydrin rubber, so that the domains formed of epichlorohydrin rubber had insufficient wear resistance.

Next, an unused product of the charging roller according to this Comparative Example was left standing for 2 weeks in a 40° C. and 95% RH environment under pressure contact with an organic photosensitive member at a load of 1 kg in total pressure. As a result, it slightly stuck to the photosensitive member surface at the roller edges. However, this did not affect at all the grade of electrophotographic images when this charging roller was set as the transfer roller in the above electrophotographic apparatus and images were formed.

Example 5

A charging roller was obtained in the same manner as in Example 1 except that the following materials were used as materials for the conductive elastic material layer.

NBR (nitrile content: 33.5%)

(trade name: NIPOL DN214; available from Nippon Zeon Co., Ltd.) 50 parts

Liquid NBR (trade name: N280; available from JSR Corporation) 30 parts

Epichlorohydrin rubber (trade name: EPICHLOMER H; available from Daiso K.K.) 5 parts Alkyl ether polymer (trade name: ZSN8030; available from Nippon Zeon Co., Ltd.) 25 parts Ethylene-propylene-diene terpolymer (EPDM) (trade name: EPT9070E; available from Mitsui Petrochemical Industries, Ltd.) 20 parts Ethylene-vinyl acetate copolymer (trade name: EVASREN; available from Dainippon Ink & Chemicals, Inc.) 5 parts The liquid NBR used in the above has units represented by the chemical formulas (A-1) and (A-2), in a copolymerization ratio (molar ratio) of 33.5:66.5. The EPDM is in a copolymerization ratio (weight ratio) of 53:36:11. The ethylene-vinyl acetate copolymer is in a copolymerization ratio (weight ratio) of 40:60.

The resistance value of the charging roller obtained was found to be $2.81\times10^7$ Ω. The value of maximum/minimum during one rotation was 1.07. The hardness was 31.4° Asker C.

The conductive elastic material layer according to this Example was also observed using a transmission electron microscope in the same manner as in Example 1, and found to have a structure in which domains formed of the alkyl ether polymer and domains formed of EPDM stood dispersed in a continuous phase formed of the NBR. The domains formed of the alkyl ether polymer were an average size of 0.40 μm, and their average distance was 0.25 μm. The domains formed of the EPDM were an average size of 7.3 μm.

The above charging roller was set as the transfer roller in the electrophotographic apparatus and evaluated in the same manner as in Example 1. As a result, good images were obtained. The extensive-operation performance (running performance) in a continuous 500,000-sheet paper feed was evaluated and it was found that faulty images did not appear, although a rise in resistance value was seen on the order of 0.05 (log(resistance after running/initial resistance)) with respect to the resistance value before running.

Next, an unused product of the charging roller according to this Example was left standing for 2 weeks in a 40° C. and 95% RH environment under pressure contact with an organic photosensitive member at a load of 1 kg in total pressure. As a result, it did not stick to the photosensitive member surface. This is considered to be due to the fact that the domains formed of EPDM are further present in the continuous phase formed of NBR.

Example 6

A charging roller was obtained in the same manner as in Example 5 except that the NBR, the liquid NBR, the epichlorohydrin rubber, the alkyl ether polymer, the EPDM and the ethylene-vinyl acetate copolymer were used in amounts of 40 parts, 30 parts, 7 parts, 33 parts, 20 parts and 5 parts, respectively. The resistance value of the charging roller obtained was found to be $1.13\times10^7$ Ω. The value of maximum/minimum during one rotation was 1.05. The hardness was 33.5° Asker C.

The conductive elastic material layer according to this Example was observed using a transmission electron microscope in the same manner as in Example 1, and was found to have a structure in which domains formed of the alkyl ether polymer and domains formed of EPDM stood dispersed in a continuous phase formed of the NBR. The domains formed of the alkyl ether polymer were an average size of 0.68 μm, and their average distance was 0.32 μm. Also, the domains formed of the EPDM were an average size of 7 μm.

The above charging roller was set as the transfer roller in the electrophotographic apparatus, and evaluation was made in the same-manner as in Example 1. As a result, good images were obtained. The extensive-operation performance (running performance) in a continuous 500,000-sheet paper feed was evaluated and it was found that faulty images did not appear, although a rise in resistance value was seen on the order of 0.04 (log(resistance after running/initial resistance)) with respect to resistance value before running.

Next, an unused product of the charging roller according to this Example was left standing for 2 weeks in a 40° C. and 95% RH environment under pressure contact with an organic photosensitive member at a load of 1 kg in total pressure. As a result, it did not stick to the photosensitive member surface. This is considered to be due to the fact that the domains formed of EPDM were made further present in the continuous phase.

What is claimed is:

1. A charging member for charging a surface of a member to be charged in an image-forming apparatus under application of a voltage, the charging member having an outermost surface layer containing a conductive elastic material, wherein said conductive elastic material comprises a polymer, and at least 70% by weight based on the total weight of the polymer is a polar polymer, wherein said polar polymer primarily comprises:

(i) acrylonitrile butadiene rubber;

(ii) an ethylene oxide-propylene oxide-allyl glycidyl ether terpolymer; and (iii) a homopolymer of epichlorohydrin, and wherein weights x, y and z of the components (i), (ii) and (iii), respectively, have a relationship represented by the following expressions (1) and (2):

$$0.2 \leqq y/(x+y+z) \leqq 0.5 \quad (1)$$

$$4 < y/z \leqq 20 \quad (2).$$

2. The charging member according to claim 1, wherein said conductive elastic material further contains an ethylene-propylene-diene terpolymer and an ethylene-vinyl acetate copolymer.

3. An image-forming apparatus having the charging number according to claim 1 or 2.

4. The image-forming apparatus according to claim 3, which comprises an electrophotographic photosensitive member, charging means for charging the electrophotographic photosensitive member, means for exposing the electrophotographic photosensitive member thus charged to form an electrostatic latent image thereon, means for developing the electrostatic latent image to form a toner image, and transfer means for transferring the toner image directly or indirectly to the surface of an image-bearing member; the transfer means having a means for charging the image-bearing member;

at least one of said charging means and said transfer means having said charging member.

5. An image-forming apparatus comprising means for transferring a toner image to a second image-bearing member from a first image-bearing member holding on the surface thereof a toner image formed by an electrophotographic system, wherein the means comprises a charging member according to claim 1 or 2 that applies potential with a polarity opposite to that of the toner image to the second image-bearing member.

6. A process cartridge comprising:

an image-bearing member; and the charging member according to claim 1 or 2, wherein the image-bearing member and the charging member are integrally supported, and wherein the process cartridge is detachably mountable on a main body of an image-forming apparatus.

* * * * *

UNITED STATES PATENT AND TRADEMARK OFFICE

CERTIFICATE OF CORRECTION

PATENT NO. : 6,951,688 B2
DATED : October 4, 2005
INVENTOR(S) : Hisao Kato et al.

It is certified that error appears in the above-identified patent and that said Letters Patent is hereby corrected as shown below:

<u>Column 5,</u>
Line 39, "is not" should read -- are not --.

<u>Column 19,</u>
Line 1, "same-manner" should read -- same manner --.

<u>Column 20,</u>
Line 5, "num-" should read -- member --.
Line 6, delete "ber".

Signed and Sealed this

Thirtieth Day of May, 2006

JON W. DUDAS

*Director of the United States Patent and Trademark Office*